Oct. 11, 1938.　　　S. T. MONTAMBO　　　2,132,828
AUTOMOTIVE EQUIPMENT
Filed April 12, 1937　　　2 Sheets-Sheet 1
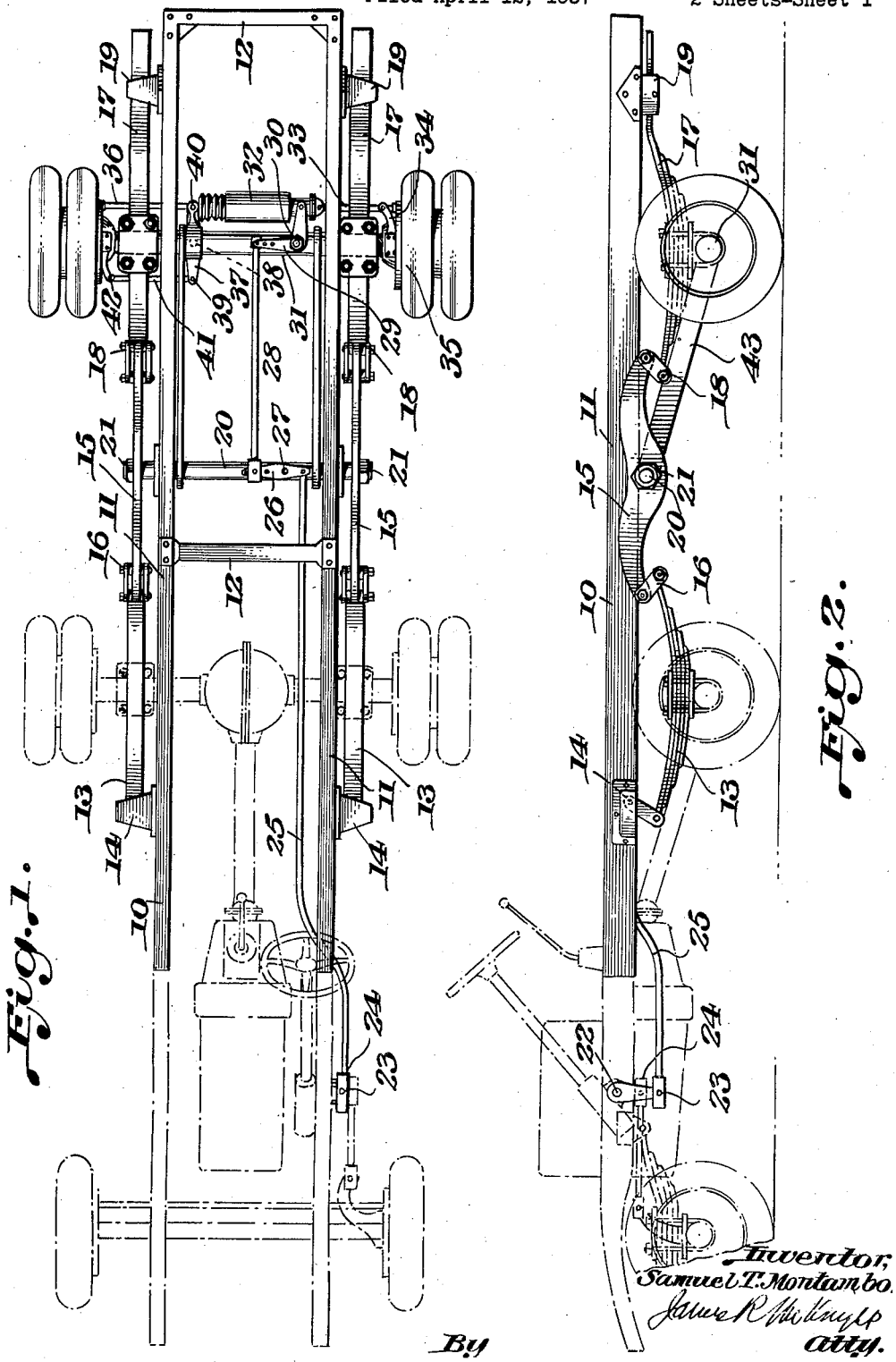

Oct. 11, 1938.  S. T. MONTAMBO  2,132,828
AUTOMOTIVE EQUIPMENT
Filed April 12, 1937  2 Sheets-Sheet 2

Inventor,
Samuel T. Montambo
By  Atty.

Patented Oct. 11, 1938

2,132,828

UNITED STATES PATENT OFFICE 2,132,828

AUTOMOTIVE EQUIPMENT

Samuel T. Montambo, Chicago, Ill., assignor of one-third to Paul W. Guthrie, Chicago, Ill., and one-third to Thomas H. Brading, Denver, Colo.

Application April 12, 1937, Serial No. 136,246

2 Claims. (Cl. 280—91)

My invention relates to a frame extension attachable to any ordinary truck chassis so as to create a three axle unit.

Among the objects of my invention are to provide a frame extension for any type of truck chassis, said frame extension carrying a third axle adapted to act as a steering axle so that the ordinary truck chassis is converted into a three axle unit. Said construction provides a greater capacity for usable loading space. Another object of my invention is to create a construction wherein the rear wheels are held rigid and taut so that they cannot be deflected by road irregularities or shimmy, and so that they may be actuated only through the steering mechanism and its connections. A further object of my invention is to create a construction so that the power cylinder provides a straight push and pull directly to the wheel steering arm eliminating all loss due to long linkage. Another object of my invention is to supply a three axle construction wherein the construction is so synchronized that the steering is on both front and rear axles, the center axle being used as a pivot, and the front and rear axles turning in opposite directions in the same proportional plane or arc. This feature provides maximum maneuverability for the vehicle.

My invention also presents such other objects, advantages and capabilities as will later more fully appear and which are inherently possessed by my invention.

While I have shown in the accompanying drawings a preferred form of my invention, yet I wish it understood that the same is susceptible of modification and change without departing from the spirit of my invention.

Figure 3:
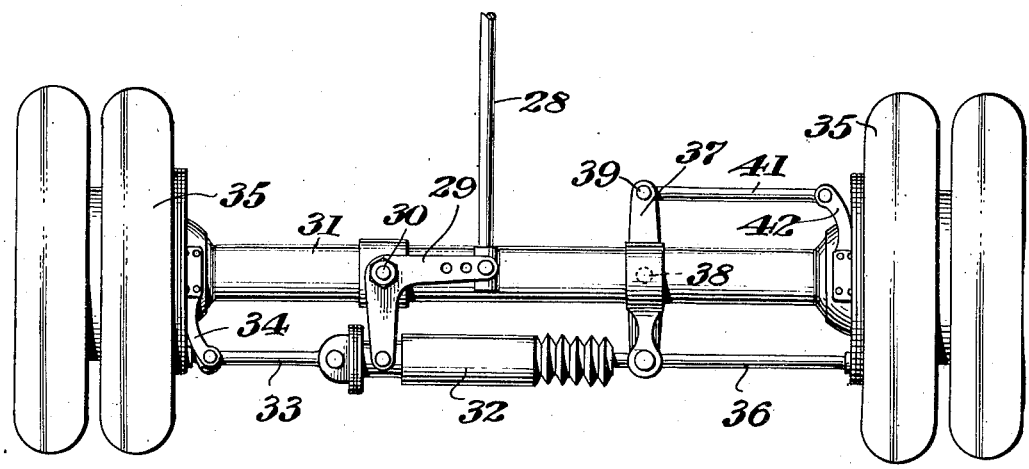
Figure 4:
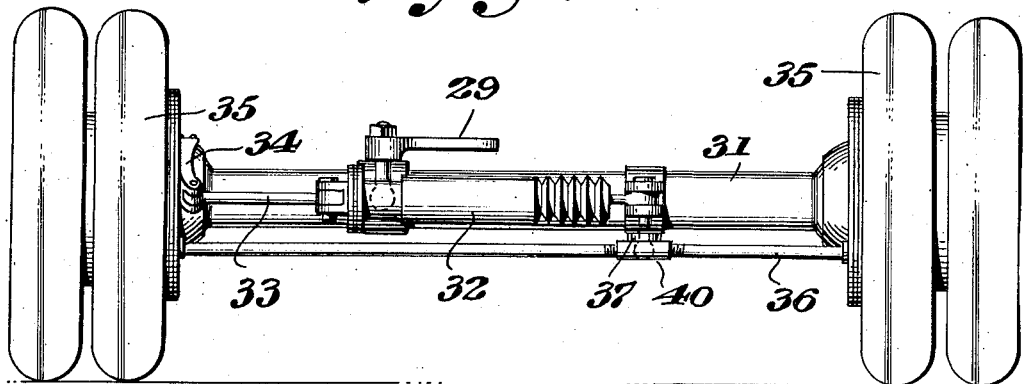
Figure 5:
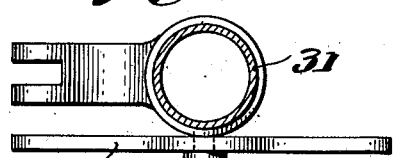

Referring to the drawings, Fig. 1 is a top plan view of the complete assembly of my novel construction with a detail view of the front pitman arm with its two studs; Fig. 2 is a side elevation of the complete assembly; Fig. 3 is a top plan view of the rear axle assembly; Fig. 4 is an end elevation of the rear axle assembly; and Fig. 5 is an end view of the axle.

Referring more particularly to the embodiment selected to illustrate my invention, my frame extension 10 is adapted to be attached to the rear of any prevailing truck chassis by rivets, bolts or any other suitable connecting means.

My frame extension 10 comprises a pair of parallel lengthwise channels 11 spaced by cross members 12. A spring 13 is attached to each of the lengthwise frame channel members 11 adjacent their forward portion by a spring hanger 14 securely fastened to the frame channel members 11. The rear end of each of springs 13 is attached to the forward end of the rocker arm 15 by means of shackles 16. To the rearward end of the rocker arm 15 is attached another spring 17 by means of shackle bolts 18. This spring 17, which is a slip spring, has its rearward end slidably positioned in spring hanger 19. The resilient member 17 is a slip spring to allow for the arc traversed by the rear axle.

A shaft 20 extends substantially parallel to cross member 12 and rearwardly thereof between lengthwise channel members 11 and provides a pivoting means to which the rocker arm 15 on each side is securely attached by means of nuts 21. Attached to the steering mechanism of the truck to which my construction is added, I replace the ordinary front pitman arm of the steering mechanism with my front pitman arm 22 which has two studs 23 and 24. The stud 24 is the one normally used to steer the front axle of the car. Stud 23 is positioned to take full advantage of the pitman arm arc as clearly shown in Fig. 2.

A drag link 25 is positioned so as to be actuated by stud 23 upon operation of the front pitman arm 22. The drag link 25 continues rearwardly to lever 26 mounted on shaft 20. Said lever pivots on point 27 so as to convert the movement of drag link 25 to the opposite direction thereby enabling rear drag link 28 to move in a direction opposite to drag link 25.

Rear drag link 28 is attached to bell crank lever 29 which pivots on point 30 attached to the axle 31. Upon movement of rear drag link 28 the bell crank lever 29 is moved so as to actuate a valve in the power steering cylinder 32. This power steering cylinder 32 may be either of the hydraulic, air or vacuum types.

Upon actuation of the valve of cylinder 32, drag link 33 which is securely attached to one end of the cylinder moves so as to carry with it at the other end steering knuckle arm 34 which is directly connected to the housing of the wheels 35. The other end of the power cylinder 32 is securely attached to the axle 31. I also provide a tie rod 36 attached on each end to the wheel housing of oppositely disposed wheels 35 so as to retain the wheels in rigid and taut position and the same relative movement, said wheels only being movable by actuation of the steering mechanism.

A lever 37 pivots on point 38 on the bottom side of axle 31. Said lever 37 has a pair of oppositely disposed studs 39 and 40. Stud 40 is attached to the rod 36 and stud 39 is attached to link 41, which in turn is attached to steering knuckle arm 42 contacting the housing of wheels 35. This construction strengthens the rigidity and tautness of the wheels and makes them impervious to road shock.

While I have shown herein my construction as attachable to an existing truck chassis, yet my construction may form a portion of a completely built automotive truck so that I desire to protect myself both on the invention of an attachment to a truck as well as an integral part of the truck itself.

It will be noted that my frame extension permits a load weight distribution of approximately 40% on the rear axle, 40% on the middle axle, and 20% of the front axle, depending, of course, to some extent upon the original wheel base of the automotive vehicle to which my frame extension is attached.

A radius rod 43 has one end pivoted on shaft 20 and is securely attached at its other end to axle 31. Connecting link 28 is pivoted at one end by a stud joint or the like to lever 27 and is pivoted at its other end to bell crank 29. The radius rod 43 permits the axle 31 to travel only in a prescribed arc. Drag link 28 placed in the same plane as radius rod 43 also travels the same arc, so that flexing of the spring does not cause longitudinal movement of drag link 28 to upset the steering of the wheels.

The radius rod is not pivoted but is attached to the axle, in order to allow the axle to move up and down but to prevent other movement as would occur if the radius rod were pivoted to the axle.

Having thus described my invention, I claim:

1. In a third axle construction for automotive vehicles, a bell crank lever mounted on said axle, means connecting the steering mechanism of the vehicle with said bell crank for actuating the same, a power cylinder having connections leading to the wheels of the third axle, said bell crank attached to said power cylinder so that upon said bell crank being actuated, it will in turn actuate the power cylinder to steer through its connections said wheels of the third axle.

2. In a third axle construction for automotive vehicles, a steering mechanism, a shaft, a conversion lever attached to said shaft, a front connection between said steering mechanism and said lever, a rear connection pivoted at its front end to said conversion lever, a bell crank lever attached to the rear end of said rear connection, a third axle, said bell crank lever pivoted to said third axle, a steering power cylinder having connections leading to the wheels of the third axle, said bell crank lever attached to said power cylinder so that upon said bell crank lever being actuated by the steering mechanism through said connections, said bell crank lever will in turn actuate said power cylinder to steer through its connections the wheels of said third axle, and a radius rod pivoted at one end to said shaft, and attached at its other end to said axle so that said connection and said radius rod both travel the same arc prescribed by the upward and downward movement of the axle.

SAMUEL T. MONTAMBO.